Patented Dec. 12, 1944

2,364,925

UNITED STATES PATENT OFFICE 2,364,925

PROCESS FOR PRODUCING PENTAERYTH-RITOL

Harold M. Spurlin, Wilmington, Del., assignor to Hercules Powder Company, Wilmington, Del., a corporation of Delaware No Drawing. Application July 21, 1942, Serial No. 451,771

17 Claims. (Cl. 260—635)

This invention relates to a process for the preparation of pentaerythritol. More particularly, it is concerned with an improved method of reacting formaldehyde and acetaldehyde in the presence of an anion exchange agent to form pentaerythritol.

Pentaerythritol has been prepared according to different procedures described in the art by the condensation of acetaldehyde with formaldehyde in alkaline medium. Considerable difficulty has been experienced in directing the reaction so as to give maximum yields of pentaerythritol and to avoid formation of undesirable by-products. For example, acetaldehyde undergoes reaction with itself to form aldol. Furthermore, either formaldehyde or acetaldehyde reacts with pentaerythritol under certain conditions to form acetals. Alkaline catalysts, such as lime, also exert deleterious effects in the reaction system when used in amounts in excess of that necessary to carry out the main reaction. All of these factors operate to decrease the yield of pentaerythritol obtained from a given amount of acetaldehyde.

Now, in accordance with this invention, it has been found that materially improved yields of pentaerythritol may be obtained and consumption of the reaction ingredients in by-product formation clearly reduced by reacting formaldehyde and acetaldehyde in the presence of an anion exchange agent which is essentially inactive toward formaldehyde and acetaldehyde of a strength great enough to give with neutral salt solution a pH of 9.5 or greater. Such exchange agents serve the double purpose of causing the reaction to proceed by maintaining a high pH, and of removing the formic acid produced by the reaction from the reaction mixture where its accumulation would otherwise stop the reaction. Furthermore, the improved method of this invention makes unnecessary the recrystallization of the pentaerythritol solution for removal of inorganic impurities.

Thus, in accordance with the improved process of the invention an aqueous solution of acetaldehyde and formaldehyde, containing a neutral salt, is reacted at a temperature of from about 20° C. to about 100° C. in the presence of an anion exchange agent which is essentially inactive toward formaldehyde and acetaldehyde, said anion exchange agent being of a strength great enough to give with neutral salt solution a pH of at least 9.5.

Now, having indicated in a general way the nature and purpose of the invention, the following example will illustrate the invention and is not to be construed as limiting the same. In the example all parts are expressed in parts by weight unless otherwise indicated.

*Example*

A solution consisting of 135 parts acetaldehyde, 1000 parts 36% aqueous formaldehyde solution, 2 parts of sodium chloride and 2000 parts water was passed through a column of methylated polyamino benzene formaldehyde resin (obtained by methylating Amberlite IR-4, a product of Resinous Products and Chemical Company Company, Philadelphia, Pennsylvania) of such a size that 8000 parts of the resin filled the column. The solution was allowed to flow through the column at such a rate that the passage of the whole column requires 22–24 hours. The column was maintained at a temperature of 30–32° C. throughout the passage of the aldehyde solution. The resin was washed with 500 parts of water and the washings were combined with the solution. The solution was then concentrated and the pentaerythritol recovered. There was obtained a 75% yield of light colored pentaerythritol of ash content less than 0.01%.

While methylated polyamino benzene formaldehyde resin was used as the anion exchange agent in the example above, it was used for purposes of illustration and not by way of limitation. The anion exchange agents suitable for use in this invention are those capable of removing the formic acid produced in the reaction as an insoluble complex which can subsequently be decomposed by alkali with formation of alkali formate and the free base. Thus, the alkaline reagent may be used repeatedly and the pentaerythritol solution produced will be uncontaminated by inorganic materials.

It has been found that anion exchange agents which possess these properties are those of sufficient strength to give with the neutral salt solution a pH of at least 9.5, and preferably a pH of at least 10.5. The anion exchange agents must also be essentially inactive towards formaldehyde and acetaldehyde, i. e., they must be of a substance which will not react with aldehydes. Other anion exchange agents besides methylated polyamino benzene formaldehyde resin which are suitable for use in this process are deacetylated, cross-linked alkylated quaternary ammonium hydroxides of chitin and cross-linked polymeric tetraalkyl ammonium hydroxide resins, as for example those formed by (1) condensation of alpha halogen omega dialkyl amine alkyl groups of such a structure that the number of carbon atoms in any molecule which intervene between any halogen atom and any amine group is at least of 7 or more and (2) replacement of the halogen ions by hydroxyl ions in the salt resin. A requirement of the mixture which is condensed is that it must contain an approximately equal number of halogen and substituted amine groups. This may be attained by mixing compounds rich in amino groups with compounds rich in halogen groups or by use of compounds equally rich in the two types of groups.

To carry out this process it is necessary that a small amount of neutral salt be present in the aqueous solution of formaldehyde at the beginning of the reaction. Ordinarily, it will not be necessary to add any neutral salt to the aqueous solution of formaldehyde and acetaldehyde, as enough neutral salt is usually present as impurities in the ingredients of the solution. If desired, however, additional neutral salt may be added to the reaction mixture. The amount of neutral salt that may be added may vary, but care should be taken to avoid adding such an amount that the salt will appear in the product, for while the excess salt does not interfere with the reaction, it will have to be removed from the product, causing additional purification. In practice it has been found that not more than 0.1% based on the weight of the solution of neutral salt is preferable, but an excess over that amount may be used if desired.

Sodium chloride was used in the example as the neutral salt. Any other neutral salt, however, may be used in its place, such as sodium sulfate, potassium sulfate, calcium bromide, calcium chloride, and the like.

If desired, the column containing the anion exchange agent may be regenerated to remove the formic acid, for example, by backwashing with a slow stream of 4% sodium hydroxide to remove the formic acid as sodium formate. Any other suitable method of regenerating the reagent may be employed, if desired.

The reaction may be carried out at a temperature from about 20° C. to about 100° C., but preferably from about 25° C. to about 60° C. The rate of flow of the reaction mixture through the column should be regulated so that the passage of a volume of one liter through a column of 10 cm. diameter x 100 cm. length of granular material will take from about 0.5 to about 100 hours. It will be understood that the body of the anion exchange agent will, to a large part, regulate the time required for the reagents.

The molar formaldehyde/acetaldehyde ratio which may be used in carrying out this invention may be from about 3:1 to about 8:1 and preferably from about 4:1 to about 5:1. The amount of anion exchange agents may vary with the time of the reaction. Generally speaking, however, the highest yields have been obtained when the amount of anion exchange agent used in carrying out this process shall contain at least about 1.2 active equivalents per molecule of acetaldehyde. By active equivalents is meant the tetraalkyl ammonium hydroxide groups in the anion exchange agent, which will react with a strong inorganic acid, such as for example, hydrochloric acid within about 0.1 hour. It is to be understood that less anion exchange agents may be used, if so desired, although decreased yields ordinarily result if the amount of resin is insufficient to remove the formic acid formed in the condensation of the formaldehyde and acetaldehyde.

The time of the reaction may vary from about 0.1 hour to about 100 hours, but preferably from about 0.5 hour to about 50 hours.

In the preparation of pentaerythritol by the method described an aqueous solution of acetaldehyde and formaldehyde, containing a neutral salt, is passed through a column containing an anion exchange agent, for example, methylated polyamino benzene formaldehyde resin. The solution of aldehydes, if desired, may be run continuously through the column containing the anion exchange agent. The effluent liquid will then be a mixture of pentaerythritol, syrup, water, and traces of unreacted aldehydes. The process may be continued until the base is saturated with formic acid or until the amount of unreacted aldehydes becomes excessively large. If desired, the column of reagent may then be regenerated by backwashing with an aqueous alkali, freeing the formic acid from the column and returning the reagent to the active condition. After the reaction is complete, the pentaerythritol solution is substantially free of inorganic materials. This solution is then concentrated and the solid pentaerythritol recovered by methods well known to the art. The resulting product is pentaerythritol light in color which is substantially ash-free showing on analysis usually less than 0.01% ash content.

The improved process of this invention has provided a method for obtaining materially increased yields of a substantially ash-free pentaerythritol. The process is one which permits the preparation of pentaerythritol by a batch or continuous process and permits easy isolation of the product in a pure form. Because of the great mechanical advantage of the process, it will greatly reduce the cost of preparing pentaerythritol eliminating, among other things, the necessity of recrystallization of the pentaerythritol solution to remove inorganic materials and allowing the regeneration of the basic material to restore it to active condition. In this manner the alkaline reagent may be used repeatedly.

What I claim and desire to protect by Letters Patent is:

1. In a process of producing pentaerythritol, the step comprising reacting an aqueous solution of acetaldehyde and formaldehyde, containing a neutral salt, at a temperature of from about 20° C. to about 100° C. in the presence of an anion exchange agent which is essentially inactive toward formaldehyde and acetaldehyde, said anion exchange agent being of a strength great enough to give with neutral salt solution a pH of at least 9.5.

2. In a process of producing pentaerythritol, the step comprising reacting an aqueous solution of acetaldehyde and formaldehyde, containing a neutral salt, at a temperature of from about 20° C. to about 100° C. in the presence of an anion exchange agent which is essentially inactive toward formaldehyde and acetaldehyde, said anion exchange agent being of a strength great enough to give with neutral salt solution a pH of at least 10.5.

3. In a process of producing pentaerythritol, the step comprising reacting an aqueous solution of acetaldehyde and formaldehyde, containing a neutral salt, at a temperature of from about 25° C. to about 60° C. in the presence of an anion exchange agent which is essentially inactive toward formaldehyde and acetaldehyde, said anion exchange agent being of a strength great enough to give with neutral salt solution a pH of at least 10.5.

4. In a process of producing penetaerythritol, the step comprising reacting an aqueous solution of acetaldehyde and formaldehyde, containing a neutral salt, at a temperature of from about 25° C. to about 60° C. in the presence of a deacetylated cross-linked alkylated quaternary ammonium hydroxide of chitin, for a period of from about 0.5 hour to about 50 hours.

5. In a process of producing pentaerythritol, the step comprising reacting an aqueous solution of acetaldehyde and formaldehyde, containing a neutral salt, at a temperature of from about 20° C. to about 100° C. in the presence of a methylated polyamino benzene formaldehyde resin.

6. In a process of producing pentaerythritol, the step comprising reacting an aqueous solution of acetaldehyde and formaldehyde, containing a neutral salt, at a temperature of from about 25° C. to about 60° C. in the presence of a methylated polyamino benzene formaldehyde resin.

7. In a process of producing pentaerythritol, the step comprising reacting an aqueous solution of acetaldehyde and formaldehyde, containing a neutral salt, at a temperature of from about 25° C. to about 60° C. in the presence of a methylated polyamino benzene formaldehyde resin for a period of from about 0.1 hour to about 100 hours.

8. In a process of producing pentaerythritol, the step comprising reacting an aqueous solution of acetaldehyde and formaldehyde, containing a neutral salt, at a temperature of from about 25° C. to about 60° C. in the presence of a methylated polyamino benzene formaldehyde resin for a period of from about 0.5 hour to about 50 hours.

9. In a process of producing pentaerythritol, the step comprising reacting an aqueous solution of acetaldehyde and formaldehyde, containing a neutral salt, at a temperature of from about 20° C. to about 100° C. in the presence of a cross-linked polymeric tetraalkyl ammonium hydroxide resin.

10. In a process of producing pentaerythritol, the step comprising reacting an aqueous solution of acetaldehyde and formaldehyde, containing a neutral salt, at a temperature of from about 25° C. to about 60° C. in the presence of a cross-linked polymeric tetraalkyl ammonium hydroxide resin.

11. In a process of producing pentaerythritol, the step comprising reacting an aqueous solution of acetaldehyde and formaldehyde, containing a neutral salt, at a temperature of from about 25° C. to about 60° C. in the presence of a cross-linked polymeric tetraalkyl ammonium hydroxide resin for a period of from about 0.1 hour to about 100 hours.

12. In a process of producing pentaerythritol, the step comprising reacting an aqueous solution of acetaldehyde and formaldehyde, containing a neutral salt, at a temperature of from about 25° C. to about 60° C. in the presence of a cross-linked polymeric tetraalkyl ammonium hydroxide resin for a period of from about 0.5 hour to about 50 hours.

13. In a process of producing pentaerythritol, the step comprising reacting an aqueous solution of acetaldehyde and formaldehyde, containing a neutral salt, at a temperature of from about 25° C. to about 60° C. for a period of from about 0.1 hour to about 100 hours in the presence of an anion exchange agent which is essentially inactive toward formaldehyde and acetaldehyde, said anion exchange agent being of a strength great enough to give with neutral salt solution a pH of at least 10.5.

14. In a process of producing pentaerythritol, the step comprising reacting an aqueous solution of acetaldehyde and formaldehyde, containing a neutral salt, at a temperature of from about 25° C. to about 60° C. for a period of from about 0.5 hour to about 50 hours in the presence of an anion exchange agent which is essentially inactive toward formaldehyde and acetaldehyde, said anion exchange agent being of a strength great enough to give with neutral salt solution a pH of at least 10.5.

15. In a process of producing pentaerythritol, the step comprising reacting an aqueous solution of acetaldehyde and formaldehyde, containing not more than 0.1% of a neutral salt, at a temperature of from about 20° C. to about 100° C. in the presence of an anion exchange agent which is essentially inactive toward formaldehyde and acetaldehyde, said anion exchange agent being of a strength great enough to give with neutral salt solution a pH of at least 10.5.

16. A process for producing pentaerythritol comprising passing an aqueous solution of acetaldehyde and formaldehyde, containing a neutral salt, through a column of an anion exchange agent maintained at a temperature of from about 25° C. to about 60° C., at such a rate that the passage of one liter through a column of 10 cm. diameter and 100 cm. length of granular material will take from about 0.5 to about 100 hours, said anion exchange agent being of a strength great enough to give with neutral salt solutiton a pH of at least 10.5.

17. In a process of producing pentaerythritol, the step comprising reacting at a temperature of from about 20° C. to about 100° C. an aqueous solution which contains a neutral salt and in which the formaldehyde/acetaldehyde ratio lies between about 4:1 and about 5:1 with an anion exchange agent containing at least 1.2 active equivalents per molecule of acetaldehyde, said anion exchange agent being of a strength great enough to give with neutral salt solution a pH of at least 10.5.

HAROLD M. SPURLIN.